Figure 1:
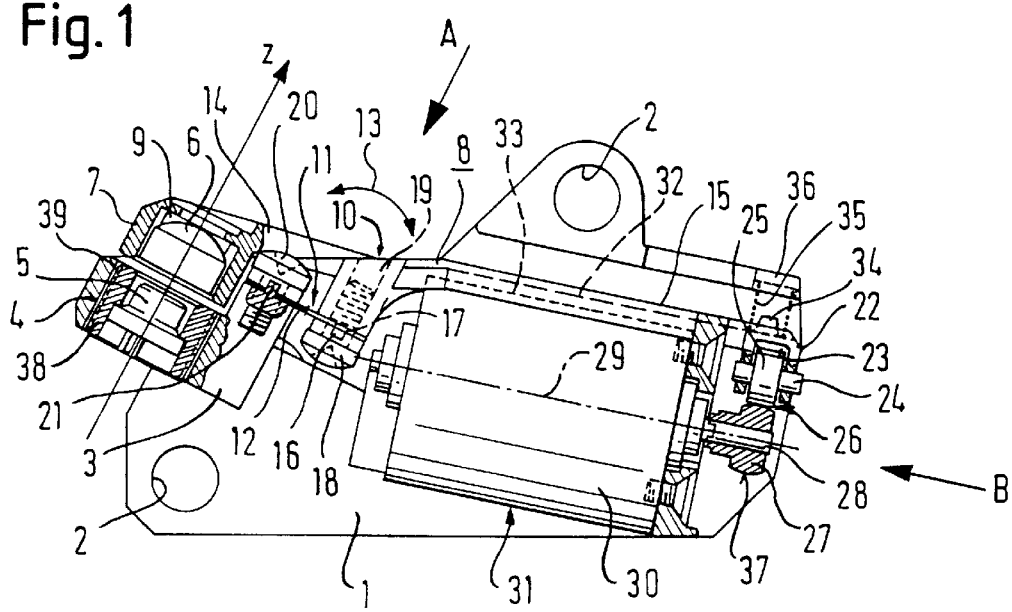

United States Patent [19]
Anselment et al.

[11] Patent Number: 6,147,820
[45] Date of Patent: Nov. 14, 2000

[54] APPARATUS FOR THE ADJUSTMENT OF THE FOCAL POSITION OF AN OPTO-ELECTRONIC APPARATUS

[75] Inventors: Christoph Anselment, Waldkirch; Heinrich Hippenmeyer, Freiamt; Ralf Paske, Waldkirch, all of Germany

[73] Assignee: Sick AG, Waldkirch, Germany

[21] Appl. No.: 09/335,386

[22] Filed: Jun. 17, 1999

[30] Foreign Application Priority Data

Jun. 19, 1998 [DE] Germany ............................ 198 27 485

[51] Int. Cl.$^7$ .............................. G02B 7/02; G02B 15/22
[52] U.S. Cl. ............................................ 359/823; 359/693
[58] Field of Search ..................................... 359/823, 822, 359/825, 830, 693, 694; 360/77.03

[56] References Cited

U.S. PATENT DOCUMENTS

| | | | |
|---|---|---|---|
| 4,882,723 | 11/1989 | Van Rosmalen | 369/256 |
| 5,231,541 | 7/1993 | Han | 359/814 |
| 5,684,645 | 11/1997 | Tomiyama et al. | 359/824 |
| 6,025,963 | 2/2000 | Hiippenmeyer et al. | 359/819 |

FOREIGN PATENT DOCUMENTS

| | | | |
|---|---|---|---|
| 0442442A1 | 8/1991 | European Pat. Off. | G11B 7/09 |
| 4136700A1 | 10/1992 | Germany | G11B 7/085 |

*Primary Examiner*—Georgia Epps
*Assistant Examiner*—Saeed Seyrafi
*Attorney, Agent, or Firm*—Townsend and Townsend and Crew LLP

[57] ABSTRACT

An apparatus is described for the adjustment of the focal position of an opto-electronic apparatus including a transmitter element which transmits light and a lens for the focusing of the light transmitted by the transmitter element. The apparatus includes a pivotal lever for receiving the transmitter element or the lens, which is pivotable via a positioning element about a pivot joint for the adjustment of the spacing between the transmitter element and the lens and thus for the adjustment of the focal position. The pivotal lever is formed as a two-armed pivotal lever, with the one arm of the pivotal lever being formed to receive the lens or the transmitter element, and with the positioning element acting on a section of the other arm of the pivotal lever lying on the other side of the pivot joint. Furthermore, a variant is described in which the positioning element extends along the longitudinal extent of the pivotal lever, as well as an opto-electronic apparatus with such an adjustment device.

25 Claims, 1 Drawing Sheet

APPARATUS FOR THE ADJUSTMENT OF THE FOCAL POSITION OF AN OPTO-ELECTRONIC APPARATUS

The invention relates to an apparatus for the adjustment of the focal position of an opto-electronic apparatus including a transmitter element which transmits light and a lens for the focusing of the light transmitted by the transmitter element. Furthermore, the invention is directed to an opto-electronic apparatus with an apparatus of this kind for the adjustment of the focal position.

Apparatuses of this kind are used in order, for example, to set the focal position of light barriers, light sensors, bar code readers or other opto-electronic apparatuses. In known apparatuses a pivotal lever is provided which is pivotable about a pivot axis provided at one end of the pivotal lever. While the lens is arranged in the central region of the pivotal lever between its two free ends, a positioning element engages at the end of the pivotal lever opposite to the pivot axis, via which the pivotal lever is adjustable about the pivot axis. In this manner the spacing between the lens and the transmitter element provided within the opto-electronic apparatus can be set and thus the focal position of the apparatus can be set.

It is a disadvantage of the known apparatuses that the positioning element is normally arranged transverse to the longitudinal extent of the pivotal lever and thus also extends sideways relatively far beyond the pivotal lever. As a result, the dimensions of such an adjusting apparatus and thus of an opto-electronic apparatus provided with such an adjusting apparatus are relatively large, which is a disadvantage with the modern trend to increase miniaturization in practically all technical areas.

BRIEF SUMMARY OF THE INVENTION

It is an object of the invention to set forth an adjustment apparatus of the initially named kind and also an opto-electronic apparatus with such an adjusting apparatus which have a reduced constructional size for the same technical functionality as known adjusting apparatuses or opto-electronic apparatuses.

This object is satisfied in accordance with the invention by an apparatus for the adjustment of the focal position of an opto-electronic apparatus including a transmitter element which transmits light and a lens for the focusing of the light transmitted by the transmitter element, the apparatus comprising a pivotal lever for receiving the transmitter element or the lens, with the pivotal lever being formed as a two-armed pivotal lever and being pivotable via a positioning element about a pivot joint for the adjustment of the spacing between the transmitter element and the lens and thus for the adjustment of the focal position, wherein the one arm of the pivotal lever is formed to receive the lens or the transmitter element and the positioning element acts on a section of the arm of the pivotal lever lying on the other side of the pivot joint.

Furthermore, the underlying object is satisfied by an apparatus for the adjustment of the focal position of an opto-electronic apparatus including a transmitter element which transmits light and a lens for the focusing of the light transmitted by the transmitter element, the apparatus comprising a pivotal lever for receiving the transmitter element or the lens, wherein the pivotal lever is pivotable about a pivot joint for the adjustment of the spacing between the transmitter element and the lens and thus for the adjustment of the focal position, and wherein the positioning element extends along the longitudinal extent of the pivotal lever.

Through the use of a two-armed pivotal lever in the manner of a seesaw, in which the lens of the transmitter element can be arranged on the one arm, and the positioning element can act on the other arm of the pivotal lever, or through the arrangement of a positioning element along the longitudinal extent of the pivotal lever, a space optimized arrangement is provided. In particular, since the lens or the transmitter element is not arranged in the central region of the pivotal lever, a part of the positioning element can be arranged between the pivotal lever and the part of the opto-electronic apparatus carrying the transmitter element or the lens, since the transmission region between the lens and the transmitter element which must be kept free is not impaired thereby, whereby a reduced constructional size is attained. Through the arrangement of the positioning elements along the longitudinal extent of the pivotal lever, a situation is achieved in which the pivotal lever and the positioning element are very compactly arranged, so that the positioning element does not in particular extend sideways beyond the pivotal lever.

Furthermore, through the formation as a double-armed pivotal lever, a balanced relationship can be achieved between the two lever arms, so that, on the one hand, an adequately large adjustment path for the focal position is achievable, and, on the other hand, the lever arm which is acted on by the positioning element can be adjusted with adequate accuracy.

In accordance with an advantageous embodiment of the invention, the positioning element extends from the point of action arranged on the one arm of the pivotal lever in the direction towards the other arm of the pivotal lever. Through this embodiment a situation is achieved in which the positioning element extends practically fully along the pivotal lever, so that a further reduction of the dimensions of the adjusting apparatus of the invention is achieved perpendicular to the longitudinal extent of the pivotal lever.

If, in accordance with an advantageous embodiment, the positioning element is formed in particular as an electrical motor, then the axis of rotation of the motor can preferably extend substantially parallel to the longitudinal extent of the pivotal lever in order to obtain a space-optimized arrangement.

In order to enable a further reduction of the constructional size of the apparatus of the invention, the pivotal lever can have a recess, in particular an aperture, with a part of the positioning element extending into the recess. In this way a reduction of the dimensions of the apparatus of the invention in the plane of movement of the pivotal lever can also be achieved, because the pivotal lever and the positioning element, for example the housing of the positioning motor, can interengage.

In accordance with a further advantageous embodiment of the invention, the positioning element acts on the pivotal lever via an eccentric member. Through this design a very fine adjustment of the pivotal lever is possible. In this respect the eccentric member can, for example, be provided on the axis of rotation of the positioning motor, or be manually actuatable from the outside.

The pivot joint is preferably formed as a leaf-spring pivot joint, because the cost for a corresponding apparatus can be reduced by such a design. It is, however, fundamentally possible for any desired customary pivot joint connections to be used.

In accordance with a further advantageous embodiment of the invention, the pivot joint is provided on a base part, with positioning elements being formed in the pivotal lever for the unambiguous fixing of the pivotal lever in at least two degrees of freedom with respect to the base part. The base part, which is normally secured to or in an opto-electronic apparatus or formed in one piece with it, thus forms the pivot point for the pivotal movement of the pivotal lever. Through the play-free positioning of the pivotal lever with respect to the pivot joint by the positioning elements, an unambiguous association of the lens and transmitter element is possible without adjustment. After the positioning of the pivotal lever by the fixing of the positioning elements, the pivotal lever is thus only pivotable about the pivot joint, and thus the lens and the transmitter element are only adjustable relative to one another with respect to their spacing. A lateral shifting of the lens and transmitter element relative to one another is reliably prevented by the positioning elements.

The positioning elements can in this arrangement, for example, include spigots which can engage free of clearance into, for example, openings provided in the leaf-spring of the leaf spring pivot joint. Other positioning elements can, however, also be provided, which ensure a clearance-free fixing of the pivotal lever with respect to the base part, and in particular with respect to the leaf-spring pivot joint in at least two degrees of freedom.

Further advantageous embodiments of the invention are set forth in the subordinate claims.

Figure 2:
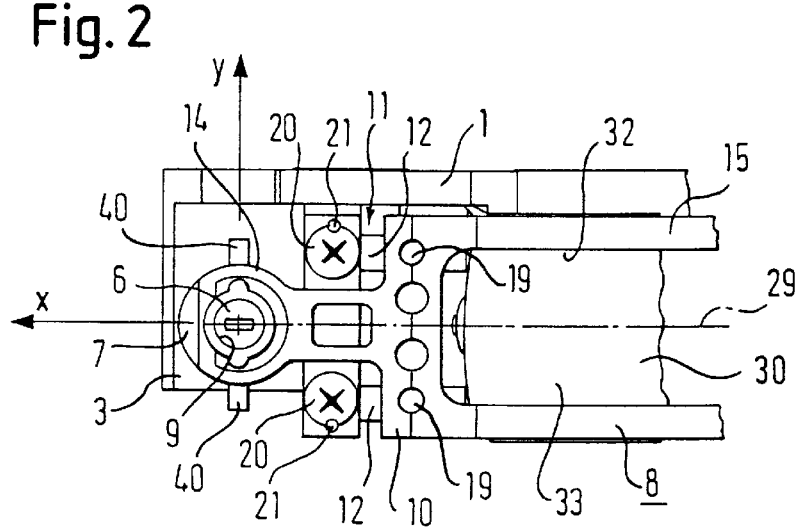
Figure 3:
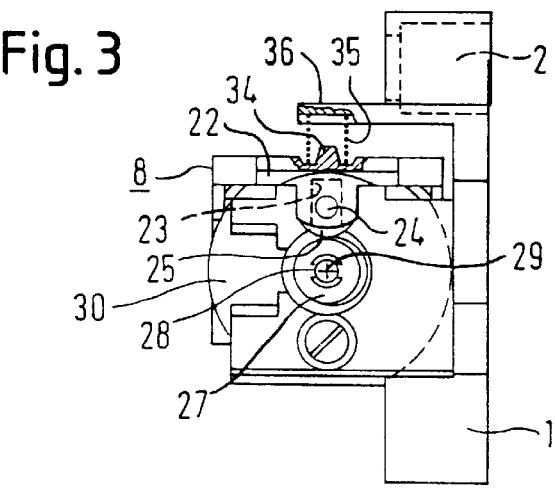

The invention will be described in more detail in the following with reference to an embodiment and to the drawings, in which are shown:

FIG. 1 a side view of an adjusting apparatus in accordance with the invention in part section, FIG. 2 a plan view of the apparatus of FIG. 1 along the arrow A, and FIG. 3 a side view of the apparatus of FIG. 1 along the arrow B.

The adjusting apparatus in accordance with FIG. 1 comprises a base part 1 with openings 2, via which it can, for example, be connected to the housing of an opto-electronic apparatus.

A formation 3 with a bore 4 is moulded onto the base part 1, in which a socket or holder 38 is received. A transmitter element 5 in the form of a diode is arranged in the socket 38. At the inner side of the bore 4 inwardly projecting runners 39 or webs are formed, which extend in the longitudinal direction of the bore 4, and which are deformed during the insertion of a socket 38 into the bore 4 or cut into the outer side of the socket 38. Through the runners 39 a rotationally fixed press seat or interference fit of the socket 38 in the bore 4 is possible, with a simultaneous possibility of displacement in the longitudinal direction of the bore 4.

The socket 38 has spigots 40 which project sideways out of the formation 3, via which the socket 38 can be displaced by a suitable tool along the runners 39 of the bore 4. The "zero focus position" of the system can be initially set to a defined position of the pivotal lever 8 via this displacement.

A lens 6 is provided opposite to the transmitter element 5 in the direction of radiation and is arranged in the region of the free end 7 of the pivotal lever 8. The pivotal lever 8 has at its free end 7 a recess 9 in which the lens 6 is secured. In this arrangement the recess 9 extends fully through the free end of the pivotal lever 8, so that the light transmitted by the transmitter element 5 can pass along an axis z through the lens 6 and through the pivotal lever 8.

The pivotal lever 8 is connected in its middle region 10 via leaf springs 12, which form a pivot joint 11, so that the pivotal lever 8 is correspondingly pivotable relative to the base part 1 in accordance with an arrow 13.

Through the pivotable mounting of the pivotal lever 8 the latter forms a two-armed pivotal lever, with a first arm 14, at the end of which the lens 6 is arranged, and with a second arm 15, which extends away from the first arm 14 beyond the pivot joint 11.

Two positioning elements formed as spigots 16 are formed on the middle region 10 of the pivotal lever 8 and engage without clearance in corresponding opening 17 in the leaf springs 12. Through this play-free connection a movement of the pivotal lever 8 is only possible with respect to the leaf springs 12 in the direction of the z axis, while movements in the two remaining directions (x- and y-directions, see FIG. 2) are prevented.

The movement of the pivotal lever 8 in the z-direction is prevented by screws 18, which are screwed through the leaf springs 12 into threaded bores 19 formed in the pivotal lever 8. Instead of screws 18 and threaded bores 19, other suitable connection possibilities can basically be used, such as, for example, riveted connections, adhesively bonded connections, soldered connections, welded connections or the like.

The leaf springs 12 are connected to the formation 3 of the base part 1 by screws 20, and the connection here can also be effected by other suitable connection means, for example by the connection means just named above.

The formation 3 likewise has positioning elements 21 formed as spigots which engage in correspondingly formed openings in the leaf springs 12 and thus determine an unambiguous, unique positioning between the leaf springs 12 and the formation 3.

A recess 23 is formed at the free end 22 of the other arm 15 of the two-armed pivotal lever 8 and a ball bearing 25, which is rotatably connected via a pin 24 to the arm 15 of the pivotal lever 8, is arranged in the recess 23.

The ball bearing forms the section 26 on which an eccentric member 27 acts, which is arranged at the free end 28 of a rotary axis 29 of the electric motor 30 and is in particular pressed onto the latter. The eccentric member 27 has a ball shaped outer surface 37, so that on pivoting of the pivotal lever 8 about the pivot joint 11, the ball bearing 25 rolls off on the ball-shaped outer surface 37 of the eccentric member 27.

The motor 30 forms, together with the eccentric member 27, a positioning element 31 for the pivotal lever 8, by which the pivotal lever 8 can be pivoted about the pivot joint 11.

The eccentric member 27 and the motor 30 extend from the section 26 of the arm 15 of the pivotal lever 8 in the direction towards its arm 14, with the axis of rotation 29 of the motor 30 extending substantially parallel to the longitudinal extent of the pivotal lever 8. An opening 32, which is in particular formed symmetrically to the axis of rotation 29, is formed in the arm 15 of the pivotal lever 8, into which a part 33 of the motor 30 extends.

At the side of the arm 15 of the pivotal lever 8 opposite to the recess 23, a guide formed as a spigot is provided for a compression spring 35 formed as a coil spring, which is arranged under pre-stress between the arm 15 of the pivotal lever 8 and a projection 36 of the base part 1, so that the arm 15 is pressed away from the projection 36 as a result of the spring force. Instead of a coil spring, another suitable shape for the spring 35 can also be selected. Furthermore, the spring 35 can basically be formed as a tension spring, and in this case secured, for example, to the arm 15 at the side of the recess 23. Instead of acting on the arm 15 of the pivotal lever 8, the spring 35 can also act in analogous manner on the arm 14 of the pivotal lever 8.

It can be seen from FIG. 2 that the housing of the motor 30 is of cylindrical shape and that the region 33 of the cylindrical housing extending in the direction of the pivotal lever 8 extends into the opening 32.

Furthermore, it can be seen from FIG. 2 that the pivot joint 11 is formed by two leaf springs. Fundamentally it is, however, also possible to combine the two leaf springs 12 into a single leaf spring, which extends over a part of the pivotal lever 8 or over the whole width of the pivotal lever 8.

It can be seen from FIG. 3 that the compression spring 35, the pin 24, which forms the axis of rotation for the ball bearing 25, and also the axis of rotation 29 of the motor 30 are arranged in a plane above one another, so that the forces produced on pivoting of the pivotal lever 8 by the eccentric member 27 lie inside this plane. An irregular loading or jamming of the apparatus is hereby reliably prevented.

On an actuation of the motor 30, the eccentric member 27 is rotated about the axis of rotation 29 of the motor 30, whereby the arm 15 of the pivotal lever 8 is shifted against the pre-stress of the compression spring 35 in the direction of the projection 36. The friction which arises is thereby reduced by the ball bearing 25.

Through the movement of the arm 15, a pivoting of the pivotal lever 8 takes place around the pivot joint 11, so that the arm 14 is moved together with the lens 6 in the direction of the transmitter element 5.

With a further rotation of the eccentric member 27, the arm 15 moves, as a result of the pre-stress of the compression spring 35, away from the projection 36, so that an oppositely directed pivoting of the pivotal lever 8 takes place, whereby the spacing between the lens 6 and the transmitter element 5 is increased.

In this manner the spacing between the transmitter element 5 and the lens 6, and thus the focal position of an opto-electronic apparatus provided with the adjusting device of the invention can be set by actuation of the motor 30.

REFERENCE NUMERAL LIST 1 base part
2 openings
3 formation
4 bore
5 transmitter element
6 lens
7 free end of the pivotal lever
8 pivotal lever
9 recess
10 central region of the pivotal lever
11 pivot joint
12 leaf spring
13 arrow
14 first arm of the pivotal lever
15 other arm of the pivotal lever
16 positioning element
17 openings
18 screws
19 threaded bores
20 screws
21 positioning elements
22 free end of the arm 15
23 recess
24 pin
25 ball bearing
26 action section
27 eccentric member
28 free end of the motor shaft
29 rotary axis
30 motor
31 positioning element
32 opening
33 part of the motor
34 spigot
35 compression spring
36 projection
37 ball shaped outer surface
38 socket
39 runners
40 spigot

What is claimed is:

1. Apparatus for the adjustment of the focal position of an opto-electronic apparatus including a transmitter element (5) which transmits light and a lens (6) for the focusing of the light transmitted by the transmitter element (5), the apparatus comprising a pivotal lever (8) for receiving the transmitter element (5) or the lens (6), with the pivotal lever (8) being formed as a two-armed pivotal lever 14,15 and being pivotable via a positioning element (31) about a pivot joint (11) for the adjustment of the spacing between the transmitter element (5) and the lens (6) and thus for the adjustment of the focal position, wherein the one arm (14) of the pivotal lever 8 is formed to receive the lens (6) or the transmitter element (5) and the positioning element (31) acts on a section (26) of the arm (15) of the pivotal lever (8) lying on the other side of the pivot joint (11).

2. Apparatus for the adjustment of the focal position of an opto-electronic apparatus including a transmitter element (5) which transmits light and a lens (6) for the focusing of the light transmitted by the transmitter element (5), the apparatus comprising a pivotal lever (8) for receiving the transmitter element (5) or the lens (6), wherein the pivotal lever (8) is pivotable via a positioning element (31) about a pivot joint (11) for the adjustment of the spacing between the transmitter element (5) and the lens (6) and thus for the adjustment of the focal position, and wherein the positioning element (31) extends along the longitudinal extent of the pivotal lever (8).

3. Apparatus in accordance with claim 1, characterized in that a positioning element (31) extends from the section (26) arranged on the arm (15) of the pivotal lever (8) in the direction towards the other arm (14) of the pivotal lever (8).

4. Apparatus in accordance with claim 1, characterized in that the pivotal lever (8) has a recess (32), in particular an aperture, and in that one part (33) of the positioning element (31) extends into the recess (32).

5. Apparatus in accordance with claim 1, characterized in that the positioning element (31) acts via an eccentric member (27) on the pivotal lever (8).

6. Apparatus in accordance with claim 1, characterized in that the positioning element (31) is in particular formed as an electrical motor (30).

7. Apparatus in accordance with claim 6, characterized in that the axis or rotation (29) of the motor (30) extends substantially parallel to the longitudinal extent of the pivotal lever (8).

8. Apparatus in accordance with claim 1, characterized in that the pivot joint (11) is formed as a leaf-spring pivot joint.

9. Apparatus in accordance with claim 1, characterized in that the pivot joint (11) is provided on the base part (1) and in that positioning elements (16) are formed on the pivotal lever (8) for the unambiguous fixation of the pivotal lever (8) with respect to the base part (1) in at least two degrees of freedom.

10. Apparatus in accordance with claim 1, characterized in that pivotal lever (8) is formed to receive the lens (6), and the base part (1) is formed to receive the transmitter element (5).

11. Apparatus in accordance with claim 1, characterized in that the pivotal lever (8) is formed to receive the transmitter element (5), and the base part (1) is formed to receive the lens (6).

12. Apparatus in accordance with claim 2, characterized in that the pivotal lever (8) has a recess (32), in particular an aperture, and in that one part (33) of the positioning element (31) extends into the recess (32).

13. Apparatus in accordance with claim 2, characterized in that the positioning element (31) acts via an eccentric member (27) on the pivotal lever (8).

14. Apparatus in accordance with claim 2, characterized in that the positioning element (31) is in particular formed as an electrical motor (30).

15. Apparatus in accordance with claim 14, characterized in that the axis of rotation (29) of the motor (30) extends substantially parallel to the longitudinal extent of the pivotal lever (8).

16. Apparatus in accordance with claim 2, characterized in that the pivot joint (11) is formed as a leaf-spring pivot joint.

17. Apparatus in accordance with claim 2, characterized in that the pivot joint (11) is provided on the base part (1) and in that positioning elements (16) are formed on the pivotal lever (8) for the unambiguous fixation of the pivotal lever (8) with respect to the base part (1) in at least two degrees of freedom.

18. Apparatus in accordance with claim 2, characterized in that pivotal lever (8) is formed to receive the lens (6), and the base part (1) is formed to receive the transmitter element (5).

19. Apparatus in accordance with claim 2, characterized in that the pivotal lever (8) is formed to receive the transmitter element (5), and the base part (1) is formed to receive the lens (6).

20. Optoelectronic apparatus having a transmitter element (5) which transmits light, a lens (6) for the focusing of the light transmitted by the transmitter element (5) and an apparatus in accordance with claim 1, in which the lens (6) or the transmitter element (5) is arranged on the pivotal lever (8).

21. Optoelectronic apparatus having a transmitter element (5) which transmits light, a lens (6) for the focusing of the light transmitted by the transmitter element (5) and an apparatus in accordance with claim 2, in which the lens (6) or the transmitter element (5) is arranged on the pivotal lever (8).

22. Apparatus in accordance with claim 20, characterized in that the lens (6) is arranged on the pivotal lever (8) and the transmitter element (5) is arranged on the base part (1).

23. Apparatus in accordance with claim 20, characterized in that the lens (6) is arranged on the base part (1), and the transmitter element (5) is arranged on the pivotal lever (8).

24. Apparatus in accordance with claim 21, characterized in that the lens (6) is arranged on the pivotal lever (8) and the transmitter element (5) is arranged on the base part (1).

25. Apparatus in accordance with claim 21, characterized in that the lens (6) is arranged on the base part (1), and the transmitter element (5) is arranged on the pivotal lever (8).

* * * * *